United States Patent
Matsuura et al.

(10) Patent No.: US 8,692,542 B2
(45) Date of Patent: Apr. 8, 2014

(54) VARIABLE RELUCTANCE RESOLVER AND ANGLE DETECTING SYSTEM THEREWITH

(75) Inventors: Mutsumi Matsuura, Kitasaku-gun (JP); Takaaki Ochiai, Kitasaku-gun (JP)

(73) Assignee: Mineba Co., Ltd., Kitasaku-Gun (JP)

( * ) Notice: Subject to any disclaimer, the term of this patent is extended or adjusted under 35 U.S.C. 154(b) by 193 days.

(21) Appl. No.: 13/428,701

(22) Filed: Mar. 23, 2012

(65) Prior Publication Data

US 2012/0274316 A1 Nov. 1, 2012

(30) Foreign Application Priority Data

Apr. 28, 2011 (JP) ................................ 2011-101745

(51) Int. Cl.
*G01B 7/14* (2006.01)
(52) U.S. Cl.
USPC ............ 324/207.17; 324/207.16; 324/207.25
(58) Field of Classification Search
USPC ........................... 324/207.16, 207.17, 207.25
See application file for complete search history.

(56) References Cited

U.S. PATENT DOCUMENTS

| | | | | |
|---|---|---|---|---|
| 3,990,062 A | * | 11/1976 | Miller et al. | 340/870.19 |
| 4,980,590 A | * | 12/1990 | Taniguchi et al. | 310/81 |
| 5,444,368 A | * | 8/1995 | Horber | 324/207.16 |
| 5,446,966 A | * | 9/1995 | Ishizaki | 33/1 PT |
| 5,949,359 A | * | 9/1999 | Vlahu | 341/116 |
| 2005/0035760 A1 | | 2/2005 | Miya et al. | |
| 2010/0254642 A1 | * | 10/2010 | Watanabe et al. | 384/448 |
| 2011/0285386 A1 | * | 11/2011 | Kikuchi et al. | 324/207.17 |

FOREIGN PATENT DOCUMENTS

| | | |
|---|---|---|
| JP | A-2000-258187 | 9/2000 |
| JP | A-2005-61943 | 3/2005 |

* cited by examiner

*Primary Examiner* — Arleen M Vazquez
*Assistant Examiner* — Neel Shah
(74) *Attorney, Agent, or Firm* — Oliff PLC

(57) ABSTRACT

A VR resolver with a shaft angle multiplier of 3× has a rotor core 104 that is provided with magnetic poles 104a and 104b, which project in a radial direction, and a magnetic pole 104c, which does not project in a radial direction. The VR resolver also has a stator core 101 provided with salient poles 102c and 102e that are wound with a cosine wave detection wire and that are connected. A zero point detecting terminal is led from the cosine wave detection wire between the cosine winding wound portions of the salient poles 102c and 102e. The zero point detecting terminal provides a voltage waveform. By setting a threshold value for the voltage waveform, an absolute angle of the rotor core 104 is measured.

4 Claims, 4 Drawing Sheets

VARIABLE RELUCTANCE RESOLVER AND ANGLE DETECTING SYSTEM THEREWITH

BACKGROUND OF THE INVENTION

1. Field of the Invention

The present invention relates to a VR (Variable Reluctance) resolver with a shaft angle multiplier of not less than 3×, by which a zero point is detected, and relates to an angle detecting system therewith.

2. Description of Related Art

Conventional VR resolvers with a shaft angle multiplier of n× repeatedly output a detection signal at n times while a rotor rotates once. Therefore, a zero point (for example, a point at angle 0°) cannot be detected only by the detection signal that is repeated at n times. As a method for detecting the zero point, the following structure is known (for example, see Japanese Unexamined Patent Applications Laid-open Nos. 2005-61943 and 2000-258187). In this structure, a VR resolver has a rotor provided with a recess and has a stator provided with a winding for detecting a zero point.

SUMMARY OF THE INVENTION

However, in the structures disclosed in Japanese Unexamined Patent Applications Laid-open Nos. 2005-61943 and 2000-258187, detection accuracy is not very good. Moreover, the winding must be additionally provided in order to detect a zero point, whereby the structures are not simple. This becomes a problem when the production cost and dimensions should be decreased. In view of these circumstances, it is an object of the present invention to provide a VR resolver with a shaft angle multiplier of not less than 3× that measures an angle with high accuracy, by which a zero point is detected without using an additional winding therefor.

According to a first aspect of the present invention, the present invention provides a VR resolver with a shaft angle multiplier of n× in which n is a natural number of not less than 3. The VR resolver includes a stator core, a rotor core, n magnetic poles, a plurality of sine winding wound portions, a plurality of cosine winding wound portions, and a zero point detecting terminal. The stator core has an inside that is provided with a plurality of salient poles. The rotor core is rotatable in the inside of the stator core. The n magnetic poles are provided to the rotor core and are equiangular when viewed from the axial direction of the rotor core. In this case, n−1 of the magnetic poles projects in a radial direction, and the other has a lower height in the radial direction compared with the n−1 of the magnetic poles. The sine winding wound portions are formed by winding a sine wave detection wire at at least a part of the salient poles. The cosine winding wound portions are formed by winding a cosine wave detection wire at at least a part of the salient poles. The zero point detecting terminal is led from a part of the sine wave detection wire that connects adjacent sine winding wound portions, or a part of the cosine wave detection wire that connects adjacent cosine winding wound portions.

According to a second aspect of the present invention, in the first aspect of the present invention, the zero point detecting terminal provides a voltage waveform having a periodicity corresponding to one rotation of the rotor core, and the voltage waveform is composed of voltage waveforms of n cycles that have a different peak value.

According to a third aspect of the present invention, in the first aspect of the present invention, an absolute angle of the rotor core is calculated based on the voltage waveform provided by the zero point detecting terminal.

According to a fourth aspect of the present invention, the present invention provides an angle detecting system including the VR resolver of the first aspect of the present invention. The angle detecting system also includes a calculating device that calculates an absolute angle of the rotor core based on a sine wave detection signal, a cosine wave detection signal, and a zero point detection signal. The sine wave detection signal is obtained from the sine windings, the cosine wave detection signal is obtained from the cosine windings, and the zero point detection signal is obtained from the zero point detecting terminal.

According to the present invention, a VR resolver with a shaft angle multiplier of not less than 3× that measures an angle with high accuracy is obtained. According to the VR resolver of the present invention, a zero point is detected without using an additional winding therefor.

PREFERRED EMBODIMENTS OF THE INVENTION

Structure

Figure 1:
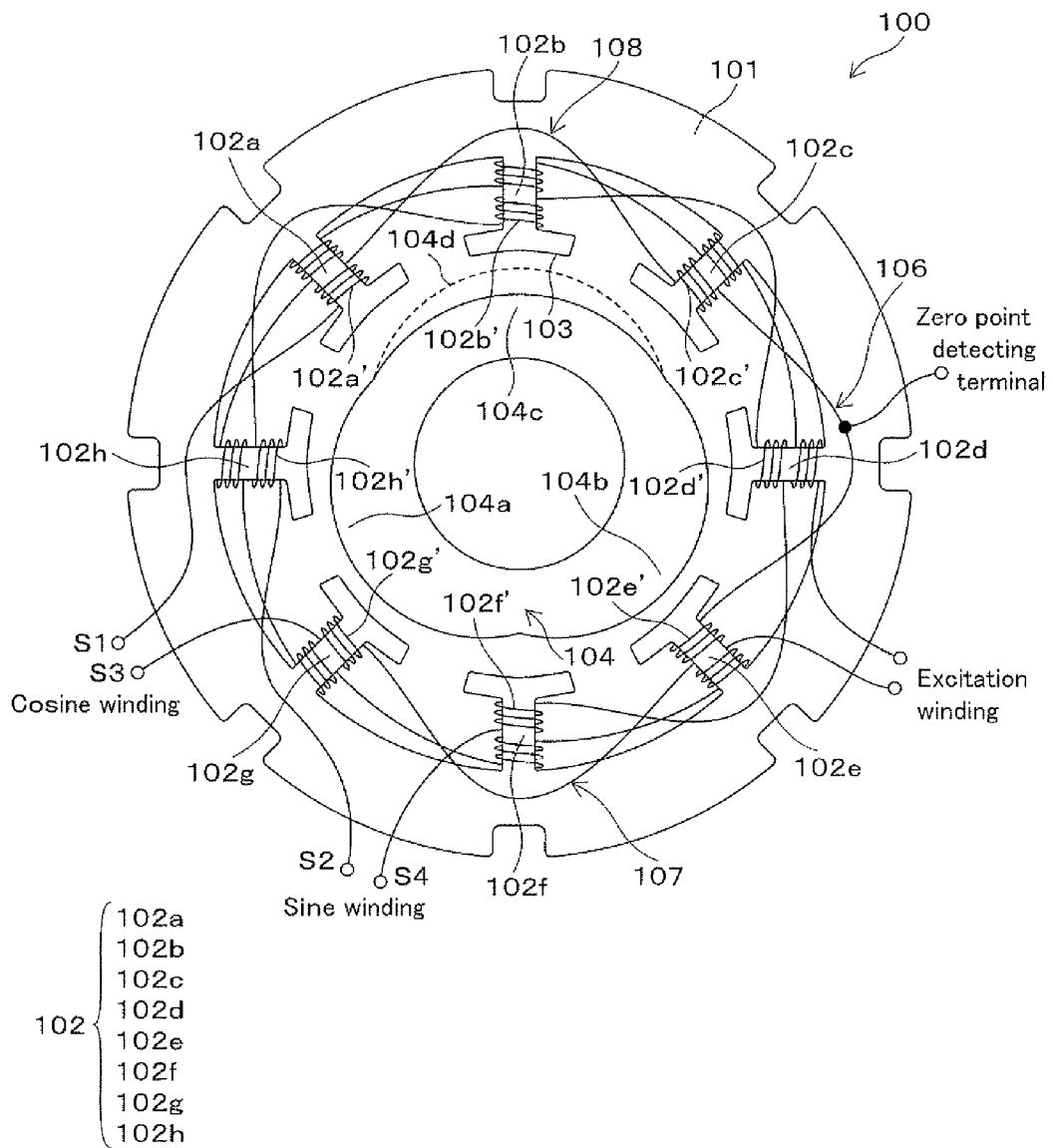
FIG. 1 is a schematic diagram of an embodiment.

FIG. 1 schematically shows a front side of an internal structure of a VR resolver 100 of an embodiment. The VR resolver 100 has a shaft angle multiplier of 3× and has a stator core 101 made of a soft magnetic material. The stator core 101 has the same structure as that of a normal VR resolver with approximately a cylindrical shape. In this example, the stator core 101 is formed by laminating plural silicon steel sheets that are punched so as to have a shape shown in FIG. 1. The stator core 101 contains a rotor core 104 that is relatively rotatable with respect to the stator core 101.

The stator core 101 has an inner periphery that is provided with eight salient poles 102. The eight salient poles 102 extend toward the rotational center of the rotor core 104 and are equiangularly arranged when viewed from the axial direction. Each of the salient poles 102 is wound with wires, which will be described later, and has a salient pole surface 103 that faces the rotor core 104 at a top portion. The salient poles 102 have the same structure as that of an ordinary VR resolver.

Figure 3:
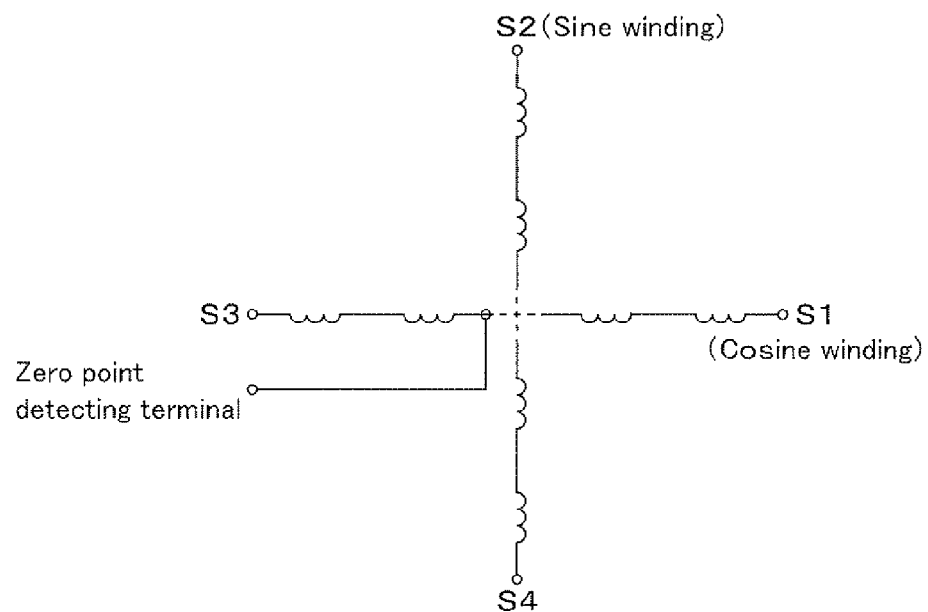
FIG. 3 is a connecting diagram of a sine winding and a cosine winding.

FIG. 1 shows eight salient poles 102a, 102b, 102c, 102d, 102e, 102f, 102g, and 102h, which are collectively indicated by 102. An example of a connecting condition of windings to the salient poles 102 will be described hereinafter. FIG. 3 is a connecting diagram of a sine winding and a cosine winding shown in FIG. 1.

As shown in FIG. 1, an excitation winding is wound to all of the eight salient poles 102 from the salient pole 102e to the salient pole 102f, the salient pole 102g, the salient pole 102h, the salient pole 102a, the salient pole 102b, the salient pole 102c, and the salient pole 102d, in turn.

The sine winding is alternately wound to the salient poles from the salient pole 102h to the salient pole 102b, the salient pole 102d, and the salient pole 102f, in turn. The salient pole 102h is provided with a sine winding wound portion 102h' by winding a sine wave detection wire. The salient pole 102b is provided with a sine winding wound portion 102b' by winding the sine wave detection wire. The salient pole 102d is provided with a sine winding wound portion 102d' by winding the sine wave detection wire. The salient pole 102f is provided with a sine winding wound portion 102f' by winding the sine wave detection wire. The sine winding is serially connected from the sine winding wound portion 102h' to the sine winding wound portion 102b', the sine winding wound portion 102d', and the sine winding wound portion 102f', in turn.

The cosine winding is alternately wound to the salient poles from the salient pole 102a to the salient pole 102c, the salient pole 102e, and the salient pole 102g, in turn. The salient pole 102a is provided with a cosine winding wound portion 102a' by winding a cosine wave detection wire. The salient pole 102c is provided with a cosine winding wound portion 102c' by winding the cosine wave detection wire. The salient pole 102e is provided with a cosine winding wound portion 102e' by winding the cosine wave detection wire. The salient pole 102g is provided with a cosine winding wound portion 102g' by winding the cosine wave detection wire. The cosine winding is also serially connected from the cosine winding wound portion 102a' to the cosine winding wound portion 102c', the cosine winding wound portion 102e', and the cosine winding wound portion 102g', in turn.

In this example, the sine winding and the cosine winding are alternately wound to the salient poles, whereby a detection signal from the sine winding and a detection signal from the cosine winding have a different phase by 90°.

Moreover, a zero point detecting terminal is led from the middle point of the cosine winding that is wound to the four salient poles in turn. That is, the zero point detecting terminal is led from a portion 106 of the cosine wave detection wire that serially connects the cosine winding wound portions 102c' and 102e', which are adjacent in a circumferential direction. The position for leading the zero point detecting terminal is selected from portions of the cosine wave detection wire that connects the adjacent cosine winding wound portions. Therefore, a portion of the cosine wave detection wire indicated by the reference numeral 107 or 108 may be used instead of the position shown in FIG. 1.

Figure 2:
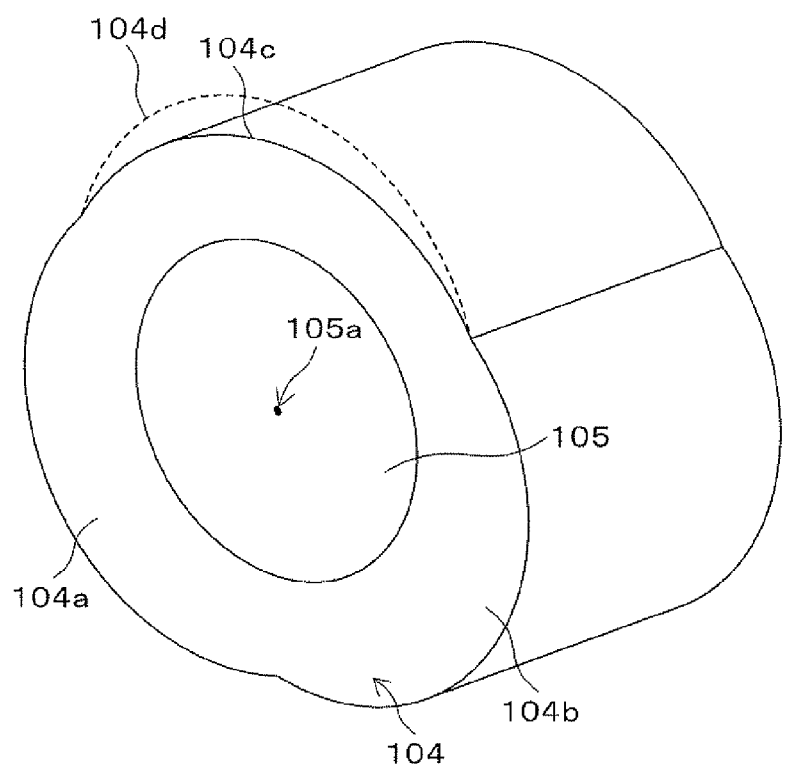
FIG. 2 is a perspective view of a rotor core of an embodiment.

As shown in FIG. 1, the stator core 101 rotatably contains the rotor core 104. FIG. 2 is a perspective view of the rotor core 104. The rotor core 104 is mounted on a shaft 105 of a rotating shaft and is rotatable around a rotation center 105a of the shaft 105 as an axis. The rotor core 104 is made of a soft magnetic material (in this case, a laminated silicon steel sheet) and has three magnetic poles 104a, 104b, and 104c.

The three magnetic poles 104a, 104b, and 104c are equiangularly positioned (at angular positions that differ by 120° in the circumferential direction) when viewed from the axial direction. The magnetic poles 104a, 104b, and 104c face the salient pole surfaces 103 with a gap therebetween. The magnetic poles 104a and 104b are projected and raised in a radial direction (toward the salient pole surfaces 103). The magnetic pole 104c has a circumferential surface equidistant from the rotation center 105a. In other words, in a rotor core of an ordinary resolver with a shaft angle multiplier of 3×, a raised portion of one (indicated by a dashed line 104d) of three magnetic poles is decreased so as to have a simple cylindrical outer circumferential surface. Thus, the magnetic pole 104c is formed.

According to this structure, a length (gap) $L_2$ between the magnetic pole 104c and the facing salient pole surface 103 is greater than a length (gap) $L_1$ between the magnetic pole 104a and the facing salient pole surface 103 and between the magnetic pole 104b and the facing salient pole surface 103. That is, when the rotor core 104 rotates, the shortest length $L_2$ of the gap between the magnetic core 104c and the salient pole surface 103 is greater than the shortest length $L_1$ of the gap between the magnetic pole 104a and the salient pole surface 103 and between the magnetic pole 104b and the salient pole surface 103.

Electrical Structure

Figure 4:
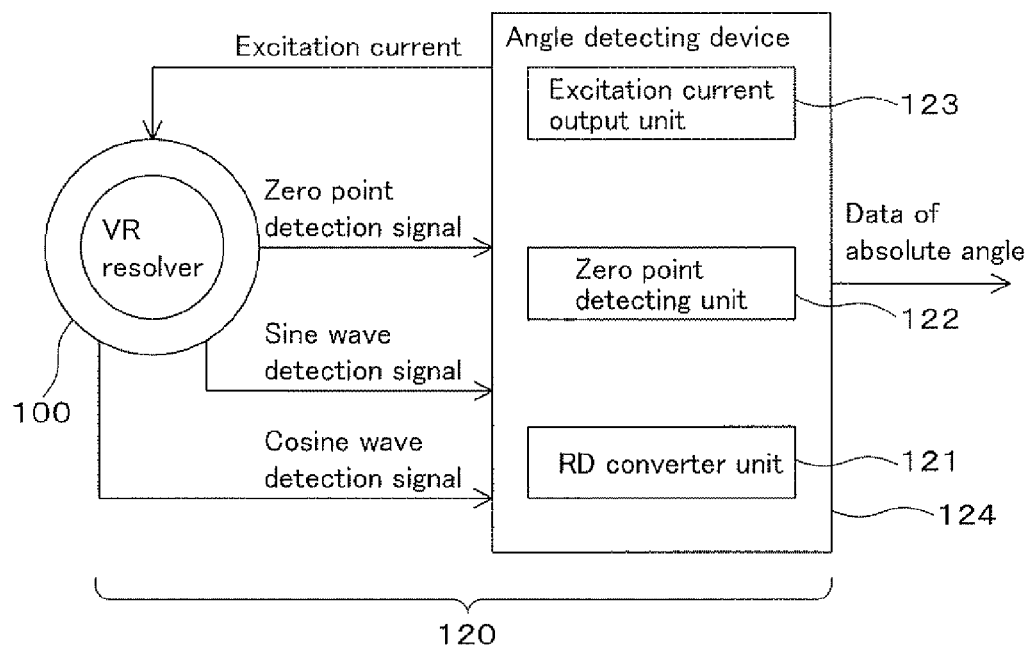
FIG. 4 is a block diagram showing an electrical structure of an embodiment.

FIG. 4 shows an angle detecting system 120 using the VR resolver 100 in the embodiment. The angle detecting system 120 includes an angle detecting device (calculating device) 124. The angle detecting device 124 is formed of a microcomputer and includes a CPU, a memory, and various interfaces. The angle detecting device 124 also includes an RD (Resolver-digital) converter unit 121, a zero point detecting unit 122, and an excitation current output unit 123.

The angle detecting device 124 supplies excitation current to the VR resolver shown in FIG. 1 and receives a zero point detection signal, a sine wave detection signal, and a cosine wave detection signal from the VR resolver 100. The zero point detection signal is an output signal obtained from the zero point detecting terminal in FIGS. 1 and 3. The sine wave detection signal is a detection signal obtained from the sine winding. The cosine wave detection signal is a detection signal obtained form the cosine winding.

The RD converter unit 121 calculates angular data detected by the VR resolver 100, based on the sine wave detection signal and the cosine wave detection signal by a method, described later. The zero point detecting unit 122 calculates a zero point of the angular position of the rotor core 104 by a method, described later. The excitation current output unit 123 outputs excitation current to the excitation winding of the VR resolver 100.

The function of the RD converter unit 121 will be described hereinafter. In order to measure an angle, excitation current of several kilohertz to several hundred kilohertz with a periodicity of sin ωt is supplied to the excitation winding of the VR resolver 100. In this condition, when the rotor core 104 rotates, the gap between the salient pole surface 103 of the stator core 101 and the rotor core 104 varies according to change of rotation angle of the rotor core 104. This is because the rotor core 104 has the two projections that are indicated by the reference numerals 104a and 104b as shown in FIG. 2, when viewed from the axial direction.

In this case, if the rotation angle of the rotor core 104 is represented as θ, since the excitation current has sin ωt, a waveform of sin θ sin ωt is obtained from the sine winding, and a waveform of cos θ sin ωt is obtained from the cosine winding. The value of θ is calculated based on the waveforms of sin θ sin ωt and cos θ sin ωt. In the case of the VR resolver with the shaft angle multiplier of 3×, outputs of three cycles are obtained while the rotor core 104 rotates once. Therefore, the value of θ calculated by the RD converter unit 121 does not correspond to the actual rotation angle (absolute angle) of the rotor core 104.

Next, the function of the zero point detecting unit 122 will be described. The zero point detecting unit 122 detects a reference angle (zero point) of the rotor core 104 based on the zero point detection signal obtained by the zero point detecting terminal. This process is called "zero point detection". The reference angle is an angular position that is preliminarily selected as a reference for measuring an angle of the rotor core 104. The function of the zero point detection will be described hereinafter.

Figure 5:
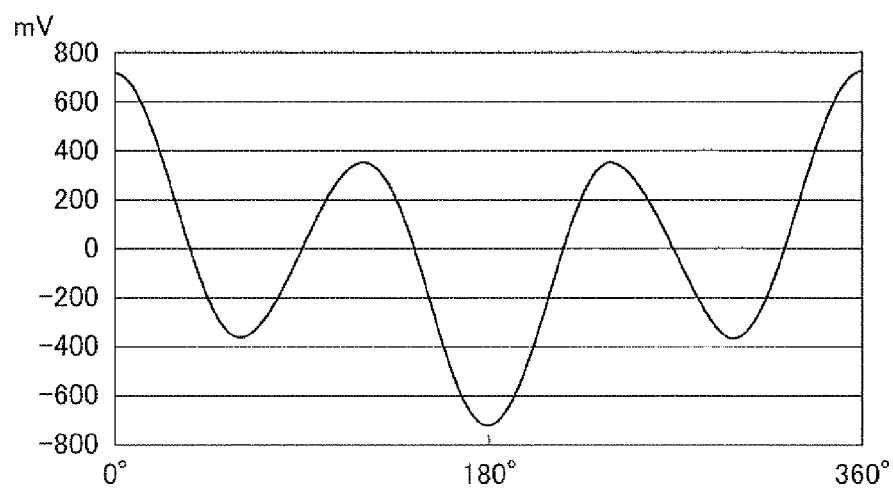
FIG. 5 is a waveform diagram of an output waveform of a zero point detecting terminal.

FIG. 5 shows an example of a signal waveform of a zero point detection signal obtained by the zero point detecting terminal. FIG. 5 shows a horizontal axis corresponding to rotation angle of the rotor core 104. FIG. 5 also shows a vertical axis corresponding to voltage value that is measured between the zero point detecting terminal and an end (S1 or S3) of the cosine winding in FIG. 1. As shown in FIG. 5, the zero point detection signal is a periodic waveform having a periodicity corresponding to one rotation of the rotor core 104. That is, a signal waveform having one cycle per rotation of the rotor core 104 is obtained by the zero point detecting unit 122. This occurs for the following reason.

A voltage waveform is measured between S1 and S3 in FIG. 1. This voltage waveform is a synthesized waveform of induced voltages that are measured at the cosine winding wound portions 102a', 102c', 102e', and 102g', which are equiangularly arranged in the circumferential direction. In this case, as the rotor core 104 rotates once, the magnetic pole 104c comes close to the salient poles 102a, 102c, 102e, and 102g, in turn. Therefore, the effect of the magnetic pole 104c appears equally in each of waveforms of a first period, a second period, and a third period of the cosine wave detection signal that contains three cycles. Accordingly, these waveforms do not differ from each other. In this embodiment, peak values of the sine wave detection signal and the cosine wave detection signal are low compared with a case in which the magnetic pole 104c has the same shape as those of the magnetic poles 104a and 104b.

On the other hand, a voltage waveform measured at the zero point detecting terminal is a synthesized waveform of induced voltages, which are detected at the cosine winding wound portions 102e' and 102g', or which are detected at the cosine winding wound portions 102a' and 102c'. Taking the salient poles 102g and 102e as an example, while the rotor core 104 rotates once, the magnetic pole 104c passes near them first (first period). Next, the magnetic pole 104b passes near them (second period), and then the magnetic pole 104c passes near them (third period). In this case, the distance (gap) between the rotor core 104 and the salient pole 103 in the third period is different from those in the first and the second periods. Therefore, peak values of the waveforms of the three cycles are different.

For the above reasons, the waveform in FIG. 5 is obtained as a zero point detection signal. According to the waveform in FIG. 5, an output exceeding 600 mV is obtained only when the rotation angle of the rotor core 104 is around a certain angle (in the case in FIG. 5, around 0°). Accordingly, the zero point detecting unit 122 monitors the zero point detection signal and outputs a predetermined angle detection signal to the RD converter unit 121 when the value of the zero point detection signal exceeds a predetermined threshold value.

The RD converter unit 121 has a memory that is preliminarily stored with a relationship between calculated angular data and the waveform in FIG. 5. Therefore, when the zero point detecting unit 122 outputs the predetermined angle detection signal, the RD converter unit 121 can detect an approximate position of the rotor core 104 by an absolute angle (actual rotation angle). Accordingly, the RD converter unit 121 obtains an absolute angle of the rotor core 104 based on the angular data calculated by itself and the predetermined angle detection signal from the zero point detecting unit 122.

Example of Movement

For example, the zero point detecting unit 122 may be set so as to output the predetermined angular detection signal at an absolute angle of around 0°. While the zero point detecting unit 122 outputs the predetermined angle detection signal, the RD converter unit 121 calculates the rotation angle of the rotor core 104 based on the sine wave detection signal and the cosine wave detection signal. In this case, for example, 0°, 120°, and 240° may be obtained. The three values are obtained because the shaft angle multiplier of the VR resolver 100 is 3×.

In this case, as described above, while the zero point detecting unit 122 outputs the predetermined angle detection signal, the rotor core 104 is at an absolute angle of around 0°. Therefore, an absolute angle of the rotor core 104 is determined to be 0°. Then, this result is output from the angle detecting device 124.

Advantages

As described above, the VR resolver 100 shown in FIG. 1 is a VR resolver with a shaft angle multiplier of 3× and has the specific rotor core 104. That is, the rotor core 104 includes the magnetic poles 104a and 104b, which project in the radial direction, and the magnetic pole 104c, which does not project in the radial direction. In addition, the zero point detecting terminal is led from the middle of the cosine wave detection wire that connects the cosine winding wound portions 102c' and 102e'. In this case, by setting a threshold value for the voltage waveform that is obtained at the zero point detecting terminal, an absolute angle of the rotor core 104 is determined.

That is, as shown in FIG. 5, the zero point is detected by a clear value difference. Therefore, measurement accuracy of an absolute angle is high. The zero point detecting terminal is led from a part of the sine wave detection wire or the cosine wave detection wire of the windings, whereby additional wire is not necessary. Accordingly, the structure of the VR resolver 100 is simple and does not increase the production cost. This is effective for reducing the dimensions and the production cost.

Other Examples

Although FIG. 1 shows an example with eight salient poles, the number of the salient poles is not limited thereto. This is the same as in the case of an ordinary VR resolver. The method of winding the wires to the salient poles is not limited to the embodiment shown in FIG. 1. For example, the sine wave detection wire and the cosine wave detection wire may be wound to all of the salient poles. In this case, the winding to the salient poles is performed so that the sine winding and the cosine winding output detection signals that have a different phase by 90°.

The position for leading the zero point detecting terminal is not limited to the case in FIG. 1 as long as it is between the adjacent winding wound portions that have the same phase. For example, the zero point detecting terminal may be led from the portion indicated by the reference numeral 107 or 108. The zero point detecting terminal may be provided in the sine winding. In this case, the position for leading the zero point detecting terminal may be selected as in the case of the cosine winding.

In a case of applying the present invention to a VR resolver with a shaft angle multiplier of 4×, a rotor core is formed so as to have four salient poles, one of which is not raised, whereas a rotor core usually has four salient poles that are raised. In the present invention, one of magnetic poles of the rotor core is made so as to have a different shape from the other magnetic poles. Thus, the measured waveform obtained at the zero point detecting terminal is made to have a periodicity corresponding to one rotation of the rotor core. Therefore, the shape of one of the magnetic poles is not limited to the shape that is not raised as shown in FIG. 2, and the above effect can be obtained by raising the magnetic pole lower than the other. In other words, the magnetic poles are formed so as to have a distance (gap) between the rotor core surface and the salient pole surface of the stator that satisfies the above-described relationship in which $L_2$ is greater than $L_1$.

The present invention can be applied when the shaft angle amplifier is not less than 2×. Since the advantages of the present invention are not effectively obtained when the shaft angle multiplier is 2×, the present invention is suitably applied to a structure with a shaft angle multiplier of not less than 3×.

Figure 6:
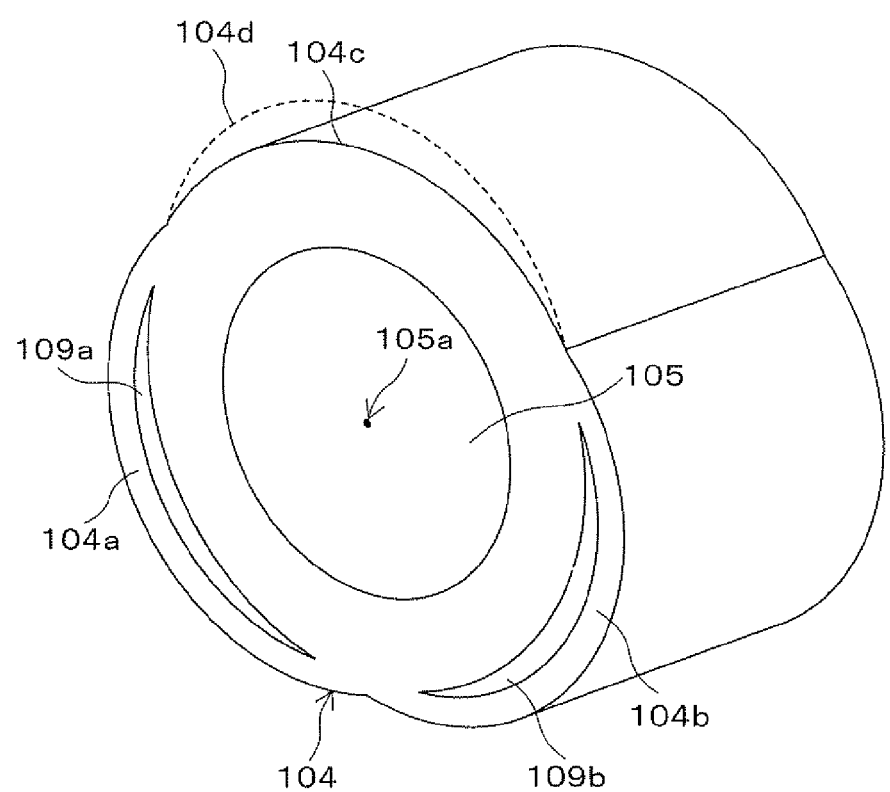
FIG. 6 is a perspective view showing another example of a rotor core.

The raised magnetic poles may be provided with a weight reducing portion such as a hollow portion, a through-hole, a recess, and the like, by partially removing structural components of the rotor core. In this case, balance of weight distribution around the axis of the rotor core is adjusted. FIG. 6 shows a modified example of the rotor core 104. In the rotor core 104 shown in FIG. 6, the magnetic poles 104a and 104b are outwardly raised and formed with through-holes 109a and 109b. The through-holes 109a and 109b have approximately crescentic shape in the cross section and penetrate in the axial direction. The through-holes 109a and 109b adjust the weight distribution of the magnetic poles 104a, 104b, and 104c around the axis and are provided so as to equalize torque at each of the magnetic poles. By providing the through-holes 109a and 109b, generation of vibrations is prevented when the rotor core 104 rotates. In this case, the balance of the weight distribution around the axis is adjusted by providing the through-holes 109a and 109b. However, recesses and the like that do not penetrate may be provided, and the shapes in the cross section thereof are not limited to the shapes shown in FIG. 6. In addition, since only reduction of the weight is necessary, the effect is also obtained by providing a hollow portion. Moreover, the number of the weight reducing portions in a raised magnetic pole is not limited to one and may be plural.

The embodiment of the present invention is not limited to each of the above embodiments and includes various modifications that may be anticipated by a person skilled in the art. In addition, the effects of the present invention are also not limited to the descriptions described above. That is, various additions, changes, and partial deletions can be performed in a range that does not exceed the general concept and object of the present invention, which are derived from the descriptions recited in the Claims and equivalents thereof.

The present invention can be used for angle detecting apparatuses.

What is claimed is:

1. A VR resolver with a shaft angle multiplier of n× in which n is a natural number of not less than 3, the VR resolver comprising:
    a stator core having an inside that is provided with a plurality of salient poles;
    a rotor core rotatable in the inside of the stator core;
    n magnetic poles provided to the rotor core so as to be equiangular when viewed from an axial direction of the rotor core, n−1 of the magnetic poles projecting in a radial direction, the other having a lower height in the radial direction compared with the n−1 of the magnetic poles;
    a plurality of sine winding wound portions formed by winding a sine wave detection wire at at least a part of the salient poles;
    a plurality of cosine winding wound portions formed by winding a cosine wave detection wire at at least a part of the salient poles; and
    a zero point detecting terminal led from a part of the sine wave detection wire that connects adjacent sine winding wound portions, or a part of the cosine wave detection wire that connects adjacent cosine winding wound portions.

2. The VR resolver according to claim 1, wherein the zero point detecting terminal provides a voltage waveform having a periodicity corresponding to one rotation of the rotor core, and the voltage waveform is composed of voltage waveforms of n cycles that have a different peak value.

3. The VR resolver according to claim 1, wherein an absolute angle of the rotor core is calculated based on the voltage waveform that is provided by the zero point detecting terminal.

4. An angle detecting system comprising:
    the VR resolver recited in claim 1; and
    a calculating device that calculates an absolute angle of the rotor core based on a sine wave detection signal, a cosine wave detection signal, and a zero point detection signal, the sine wave detection signal being obtained from the sine windings, the cosine wave detection signal being obtained from the cosine windings, and the zero point detection signal being obtained from the zero point detecting terminal.

* * * * *

UNITED STATES PATENT AND TRADEMARK OFFICE
CERTIFICATE OF CORRECTION

PATENT NO. : 8,692,542 B2  
APPLICATION NO. : 13/428701  
DATED : April 8, 2014  
INVENTOR(S) : Mutsumi Matsuura et al.

Page 1 of 1

It is certified that error appears in the above-identified patent and that said Letters Patent is hereby corrected as shown below:

On the Title Page

Item (73) Assignee: delete "Mineba Co., Ltd. (Kitasaku-Gun, JP)" and insert

-- Minebea Co., Ltd. (Kitasaku-Gun, JP) --.

Signed and Sealed this  
Twenty-second Day of July, 2014

Michelle K. Lee  
*Deputy Director of the United States Patent and Trademark Office*